(12) United States Patent
Gezgin et al.

(10) Patent No.: US 6,859,670 B1
(45) Date of Patent: Feb. 22, 2005

(54) METHOD AND APPARATUS FOR PREDICTING TRANSIENT RESPONSE OF A CLOSED LOOP APPARATUS

(75) Inventors: Cahit Gezgin, Murphy, TX (US); Chris Morrow Young, Austin, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 995 days.

(21) Appl. No.: 09/712,497

(22) Filed: Nov. 14, 2000

Related U.S. Application Data

(63) Continuation-in-part of application No. 09/609,044, filed on Jun. 30, 2000, now Pat. No. 6,760,633.

(51) Int. Cl.$^7$ .............................................. G05B 13/02
(52) U.S. Cl. ............................. 700/44; 700/37; 700/45; 703/14; 702/57; 702/60
(58) Field of Search ............................. 700/14, 28, 37, 700/44, 45, 52; 702/57, 60; 703/12, 13, 14

(56) References Cited

U.S. PATENT DOCUMENTS

| | | | | |
|---|---|---|---|---|
| 2,123,178 | A | | 7/1938 | Bode .......................... 179/171 |
| 5,296,794 | A | * | 3/1994 | Lang et al. .................. 318/715 |
| 5,567,227 | A | * | 10/1996 | Henderson ...................... 95/22 |
| 5,818,245 | A | * | 10/1998 | Allfather ..................... 324/707 |
| 6,054,867 | A | * | 4/2000 | Wakamatsu .................. 324/650 |
| 6,281,650 | B1 | * | 8/2001 | Yutkowitz .................... 318/561 |
| 6,519,538 | B1 | * | 2/2003 | Bowman et al. ............... 702/65 |
| 6,760,633 | B1 | * | 7/2004 | Young .......................... 700/44 |

OTHER PUBLICATIONS

H.W. Bode, "Relations Between Attenuation and Phase in Feedback Amplifier Design"; Bell System Technical Journal, Jul. 1940.

(List continued on next page.)

*Primary Examiner*—Leo Picard
*Assistant Examiner*—Carlos Ortiz Rodriguez

(57) ABSTRACT

A method for predicting transient response of a closed loop apparatus includes the steps of: (a) providing a first reference tool that relates load-free impedance response with a first design gain-phase variable; (b) providing a second reference tool that relates load-free impedance response with a second design gain-phase variable; (c) determining a combined impedance response as a function of frequency; (d) employing at least one of the first and second reference tool to establish a first design value for one of the phase variable and the design load impedance at a characteristic frequency that occurs at a peak value of the combined impedance response; (e) employing at least one of the first and second reference tool to establish a second design value for the other parameter of the phase variable and the design load impedance at the characteristic frequency; (f) establishing a transient multiplier as a function of frequency associated with the output voltage with the design load impedance for selected values of phase margin; (g) creating a third reference tool relating the transient multiplier with phase margin; (h) employing the third reference tool to establish a third design value for the transient multiplier associated with the characteristic frequency and at least one of the first design and second design value; and (i) mathematically combining at least two of the first, second and third design value with a design step current to establish transient excursion of the output voltage in response to applying the design step current.

24 Claims, 12 Drawing Sheets

OTHER PUBLICATIONS

V. Joseph Thottuvelil and George C. Verghese, "Analysis and Control Design of Parallelled DC/DC Converters With Current Sharing"; IEEE Transactions on Power Electronics; Jul., 1998.

H. Nyquist, "Regeneration Theory"; Bell System Technical Journal, Jan. 1932.

Allen F. Rozman and Kevin J. Foellhoelter, Circuit Considerations for Fast, Sensitive, Low–Voltage Loads in a Distributed Power System, APEC 1995 Conference Proceedings, 1995.

*Fundamentals of Power Electronics* by Robert W. Erickson; Kluwer Academic Publishers, Boston, MA; 1997.

\* cited by examiner

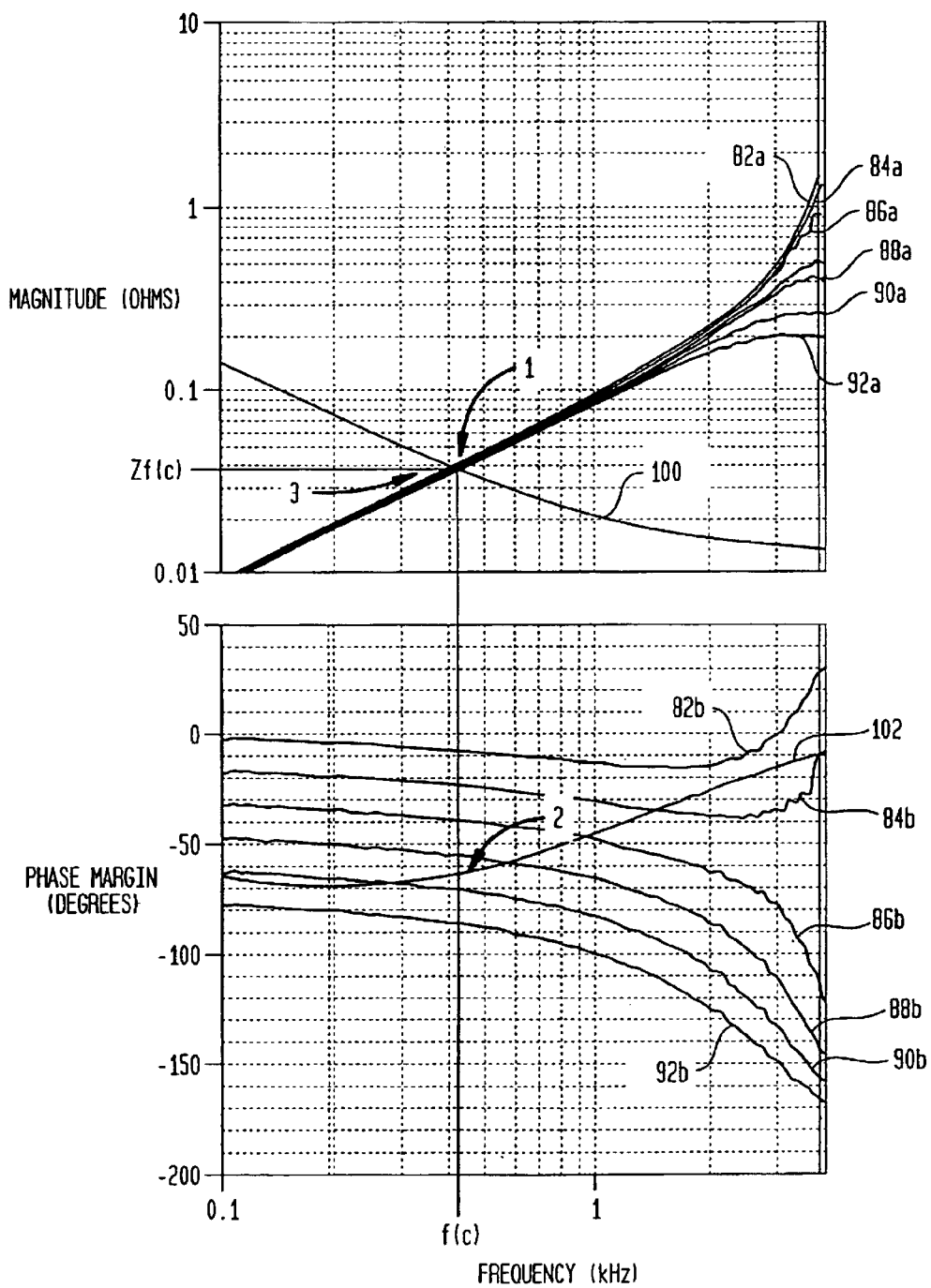

METHOD AND APPARATUS FOR PREDICTING TRANSIENT RESPONSE OF A CLOSED LOOP APPARATUS

This is a continuation-in-part of application U.S. Ser. No. 09/609,044, filed Jun. 30, 2000 now U.S. Pat. No. 6,760,633.

BACKGROUND OF THE INVENTION

The present invention is directed to a method and apparatus for predicting transient response characteristics of power supplies or other closed loop systems under arbitrary load conditions. The present invention is particularly directed to a method for predicting transient response characteristics for direct current, DC-to-DC, power supplies.

When designing certain systems, such as power supply, or power converter circuits, one must take into account the potential user's load characteristics. This consideration is especially important in the design of DC-DC converters because such converters are generally configured as a closed loop system that monitors its output, provides feedback indicating its output, and employs the feedback to adjust to maintain a constant DC output. In any feedback system, it is of significant importance that the feedback loop be stable. A simple example of an unstable feedback loop is the loud tone produced in the presence of audio feedback when a microphone is placed too close to a speaker producing signals originating at the microphone.

Today's electronic devices are more and more designed to be faster, smaller, and more reliable. This trend for product requirements is especially evident in portable electronic devices such as cellular telephones, electronic games, and portable computers. Some practical design consequences of this trend are that output voltages for DC-DC converters are getting lower and the stability of output of DC-DC converters is more difficult to attain for certain loads or applications.

The fact that a user's load characteristics figure so intimately in stability of DC-DC converter circuits, and the ever more stringent requirements for greater stability at lower voltages for modern electronic circuits have made present ways of predicting stability of a particular DC-DC converter circuit for a particular application uneconomical and not particularly reliable or accurate.

Nyquist developed criteria to assess the stability of a control loop ("regeneration Theory", H. Nyquist, Bell System Technical Journal, January 1932). Bode ("Relations Between Attenuation and Phase in Feedback Amplifier Design", Bell System Technical Journal, July 1940) expressed these criteria in terms of the phase ($\phi$) and gain of a transfer function. According to this analysis, if gain (dB) and phase change ($\Delta\phi$) of the loop gain are zero at the same frequency in a circuit, the circuit will be unstable.

As a practical engineering measure, one must design a circuit having $\geq 45°$ phase margin to reliably have a stable circuit. Phase margin is the value of phase when gain as a function of frequency crosses through zero from positive to negative. Thus, when gain is 0 dB, and gain is passing from positive to negative, phase must be $\geq 45°$ in order for the circuit under consideration to be stable with adequate margin.

Another measure of stability is to require that gain margin be $\geq -7$ to $-10$ dB. That is, when phase as a function of frequency crosses through zero, gain must be at least 7–10 dB in order that the circuit under consideration will be a stable circuit.

Presently, manufacturers of power supplies, and especially of DC-DC converters, use simulations, or laboratory measurements, or closed form analytical expressions, or all three of those methods for determining whether a particular circuit is stable with a particular load. Simulations are expensive in that they occupy large amounts of computer capacity and time. Closed form analytical expressions rely on simplifying assumptions that introduce significant errors. Laboratory measurements are an expensive approach to answering questions about a particular circuit-load stability in terms of human time and computer assets involved. Further, neither simulations, closed form analytical expressions nor laboratory experimentation are particularly accurate in predicting stability of converter apparatuses under various load conditions.

One result of ongoing efforts to predict stability with arbitrary loads is that manufacturers of power converters must essentially custom-tailor their products to user's loads on a case-by-case basis. Such a "job shop" approach to production precludes one's taking advantage of the economies of scale which could be enjoyed if a manufacturer could predict which loads were amenable to stable use with particular converters. That is, if manufacturers could predict stability for a particular converter circuit for a particular load without having to physically evaluate the converter circuit with the particular load, then the inefficiencies of customizing converter circuits for each discrete load criterion may be avoided.

A product designer is concerned with stability of the circuits that are incorporated in the products, but must also be concerned with the transient response characteristics of the circuits. That is, there must be consideration of the transient voltage characteristics and the settling time of the design. Settling time for a circuit or system is the time that lapses from a perturbation of the system until the parameter being measured (e.g. output voltage in the case of a typical power supply) is within a desired percentage of a desired value. Specifically, by way of example, settling time for a power supply may be the time for a power supply's output voltage to return to within 1–2% of a desired design output voltage for the power supply after the power supply is switched on. The transient voltage is the amplitude excursion of the output voltage during the settling time interval.

If manufacturers could also predict transient response characteristics for a particular converter circuit for a particular load without having to actually physically evaluate the converter circuit with the particular load, they would enjoy an added advantage in predictability of critical operational characteristics of their products.

Moreover, one may use the present invention to ascertain design characteristics necessary for products to exhibit certain operational characteristics. For example, one may determine that a product desirably should operate with a particular transient peak voltage and settling time for a particular current step-change. Using the present invention, a designer may determine appropriate design parameters for the desired product operating characteristics.

Manufacturers enjoying such an advantage in predictability of operational characteristics of their products vis-à-vis loads may produce converter apparatuses for "off-the-shelf" availability to customers with evaluation tools enabling customers to select which of the converters will accommodate the particular loads they are designing.

There is a need for a method for predicting transient response characteristics of power converters under arbitrary load conditions. This need is particularly acute in predicting transient response characteristics of DC-DC power converter circuits.

It would be particularly useful if transient response characteristics of power supply apparatuses could be predicted without having to test the power supply apparatus under the particular load condition for which a transient response determination is desired.

The method of the present invention allows evaluation of the transient response of a power supply apparatus for various load conditions without having to recharacterize the apparatus for each given load.

SUMMARY OF THE INVENTION

A method for predicting at least one transient response characteristic of a closed loop apparatus having an open loop impedance, a design load impedance, an output voltage and at least one inherent internal gain includes the steps of: (a) providing a first reference tool that relates impedance response of the apparatus, independent of the design load impedance, with a first variable of a gain variable and a phase variable; (b) providing a second reference tool that relates impedance response of the apparatus, independent of the design load impedance, with a second variable of a gain variable and a phase variable other than the first variable; (c) determining a combined impedance response for the apparatus as a function of frequency; the combined impedance response involving the open loop impedance, the design load impedance and the at least one inherent internal gain; (d) employing at least one of the first and second reference tool to establish a first design value for one parameter of the phase variable and the design load impedance at a characteristic frequency; the characteristic frequency occurring substantially at a peak value of the combined impedance response; (e) employing at least one of the first and second reference tool to establish a second design value for the other parameter of the phase variable and the design load impedance than the one parameter at the characteristic frequency, (f) vectorally establishing a transient multiplier factor that is associated with the output voltage with the design load impedance as a function of frequency for selected values of phase margin; (g) creating a third reference tool relating the transient multiplier factor with the selected values of phase margin as a function of frequency; (h) employing the third reference tool to establish a third design value for the transient multiplier factor associated with the characteristic frequency and at least one of the first design value and the second design value; and (i) mathematically combining at least two of the first design value, the second design value and the third design value with a design step current according to a predetermined relation to establish transient voltage excursion of the output voltage substantially at the characteristic frequency in response to applying the design step current.

The apparatus includes a first reference tool relating a first impedance scaling value with a first design variable; a second reference tool relating a second impedance scaling value with a second design variable; and a third reference tool relating the design load impedance with a third design variable.

The stability of a controlled apparatus, that is an apparatus with regeneration or feedback, such as a regulated power supply, power converter, amplifier or other closed loop apparatus, is an important, if not critical, consideration in any application of that apparatus. Measures of the stability or potential stability of a controlled apparatus include the phase margin and the gain margin. Preferably, both the phase margin and the gain margin of an apparatus are considered in evaluating the stability of the apparatus. Such margin measures are an indication of how close the control system or the loop response of that apparatus is to instability. The loop response itself is a function of the load placed on the output of such an apparatus.

The conventional approach to evaluate or determine the margins of such an apparatus has been to generate a Bode plot of the loop response for a specific load condition. By inspection of such a Bode plot one may determine the value of the margin of the apparatus being evaluated for that specific load condition. In the case where the load is to be designed appropriately to maintain the apparatus in a stable condition during operation, the conventional approach has resulted in a time consuming process of iterations of load adjustments, Bode plot generation for each adjustment, inspection and readjustment. By such iterative employment of the conventional approach, one may step-wise ascertain a load that permits stable operation of an apparatus.

The preferred embodiment of the present invention produces a response plot of a closed loop apparatus that is not dependent on the load characteristics with which the apparatus is to be employed for the basic plot generation. As a result, the same plot can be used to determine the operating margin of the apparatus characterized by the plot for any variation of the load with which the apparatus is to be employed. Such a load-independent evaluation method can significantly reduce the effort of characterizing the response of a power supply apparatus for a given load.

Another characteristic of interest to product designers and other users of closed loop devices, such as power converters, is transient response characteristics of the devices. Transient response characteristics include two aspects: (1) transient voltage (e.g., how the closed loop system responds to imposition of a perturbation, such as a step-change in current); and (2) settling time (e.g., how long the system takes to settle to within a predetermined amount of a quiescent value after imposition of the perturbation). The teachings of the present invention are broadly applicable to any closed loop system, including for example fluid systems; air conditioning systems, television sets, food mixers and other home appliances; engine governors and controllers; power generation systems for a city and other systems. The teachings of the present invention are particularly applicable to power converter circuits and apparatuses.

Features of the present invention will be apparent from the following specification and claims when considered in connection with the accompanying drawings, in which like elements are labeled using like reference numerals in the various figures, illustrating the preferred embodiment of the invention.

DETAILED DESCRIPTION OF THE INVENTION

Figure 1:
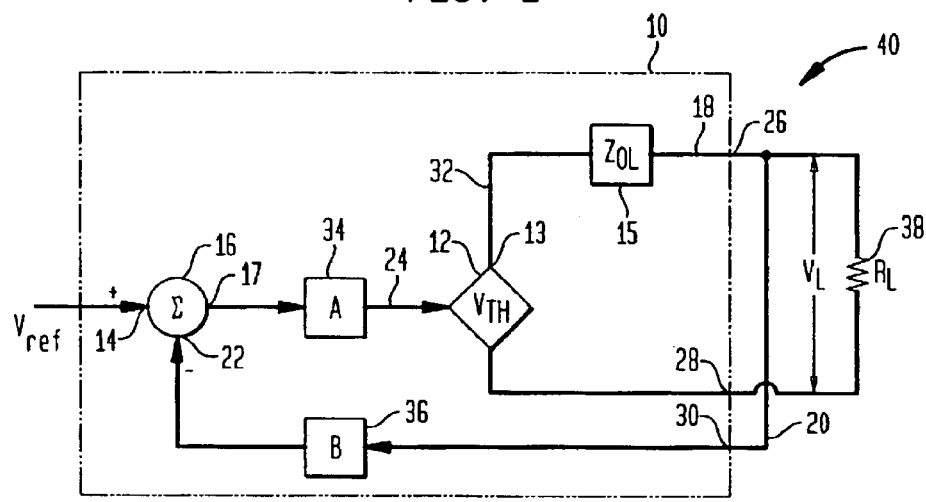
FIG. 1 is an electrical schematic diagram of a power converter apparatus connected with a resistive load.

FIG. 1 is an electrical schematic diagram of a power converter apparatus connected with a resistive load. Thottuvelil and Verghese characterized a power converter using the power converter apparatus of FIG. 1 as a Thevenin voltage source model in their paper setting forth a small-signal stability analysis of paralleled DC-DC converter systems. (See, V. Joseph Thottuvelil and George C. Verghese; "Analysis and Control Design of Paralleled DC/DC Converters with Current Sharing"; IEEE Transactions on Power Electronics, Vol. 13, No. 4; July 1998.).

In principle, the load indicated in FIG. 1 could as well be a complex load. A resistive load is used to illustrate the method of the present invention in connection with FIG. 1 to simplify the explanation. In FIG. 1, a power converter apparatus 10 includes a Thevenin voltage source 12 providing a voltage $V_{TH}$ and connected in series with an open-loop output impedance 15. Open-loop output impedance 15 has a value of $Z_{OL}$. Converter apparatus 10 has two output loci, or terminals 26, 28 and a sense locus, or terminal 30. Output terminals 26, 28 are connected with an output circuit 40. Output circuit 40 includes a resistive load 38 connected across output terminals 26, 28. Resistive load 38 has a value $R_L$.

A reference voltage $V_{REF}$ is applied to a positive input node 14 of a difference generator 16. Difference generator 16 also receives, at a negative input node 22, a feedback signal multiplied by a gain stage 36 having a gain B, via a sense line 20 from output side 18 of open-loop output impedance 15, via output terminal 26 and via sense terminal 30. The difference between reference voltage $V_{REF}$ at positive input node 14 and the feedback signal at negative input node 22 is provided as a control signal by difference generator 16 from an output node 17 via a line 24 subject to a gain A, represented by a box 34, to control Thevenin voltage source 12. The control signal provided from output node 17 of difference generator 16 keeps Thevenin voltage source 12 generating a signal having a voltage value $V_{TH}$. Thevenin voltage source 12 provides voltage $V_{TH}$ to open-loop impedance 15 from an output node 13 via a line 32. Gain A, represented schematically at box 34, is the gain from output node 17 of difference generator 16 to output node 13 of Thevenin voltage source 12. Gain A and Gain B are inherent internal gains of power converter apparatus 10. Gain A does not include the effect of open-loop output impedance 15, or any external load impedances. Gain B, represented schematically at box 36, is the gain from sensed voltage at output terminal 26 to negative input node 22 of difference generator 16.

In a power supply apparatus such as power converter apparatus 10 illustrated in FIG. 1, an important design objective is to limit variations in $V_L$ relative to $V_{REF}$. The variation of $V_L$ with respect to $V_{REF}$ is given by the equation:

$$\frac{V_o}{V_R} = \frac{\gamma A}{1 + \gamma A B} \quad [1]$$

where γ is given by:

$$\gamma = \frac{Z_L}{Z_L + Z_{OL}} \quad [2]$$

where $Z_{OL}$ is open loop impedance;
$Z_L$ is load impedance (illustrated as resistive load $R_L$ in FIG. 1).

The second term of the denominator of Equation [1], in conventional control theory, is recognized as the loop gain. That is, the loop gain (LG) is given by the equation:

$$LG = AB\frac{Z_L}{Z_L + Z_{OL}} \quad [3]$$

It is important to recognize that the loop gain is a function of load impedance $Z_L$. As a consequence, any time load impedance $Z_L$ is changed, loop gain is changed.

Figure 2:
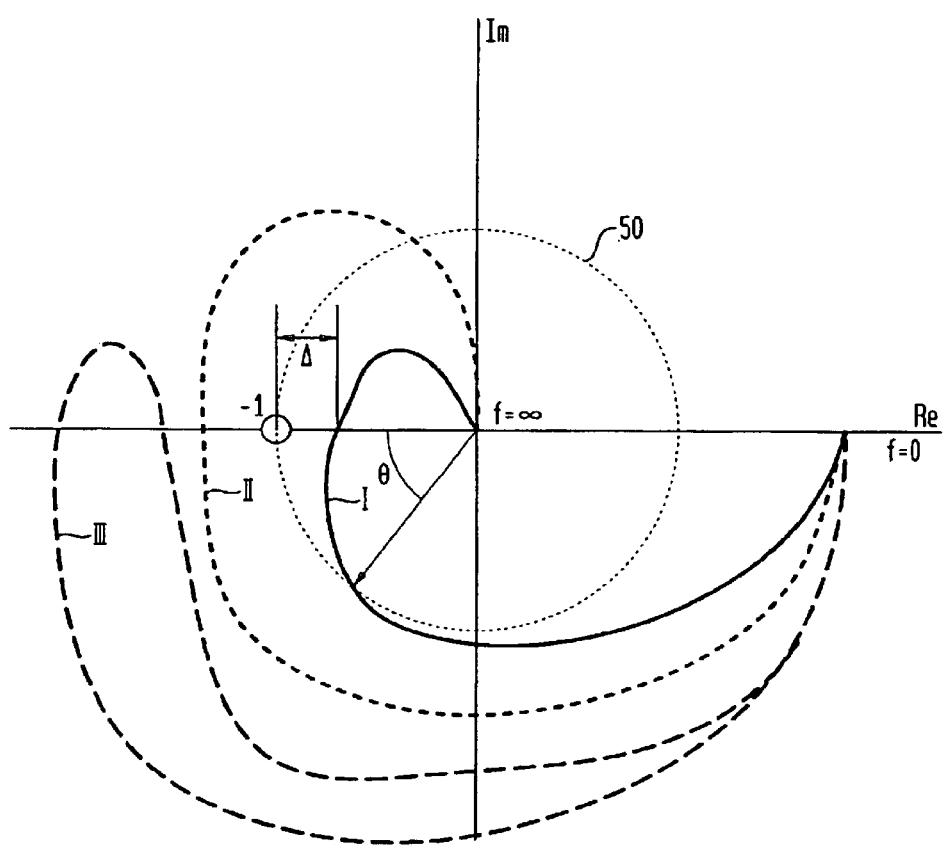
FIG. 2 is an exemplary Nyquist Plot of real and imaginary parts of loop gain in a closed loop apparatus.

FIG. 2 is an exemplary Nyquist Plot of real and imaginary parts of loop gain in a closed loop apparatus. In general, loop gain is a complex function; that is, a function containing real and imaginary components. In 1932, Nyquist (*Bell System Technical Journal*, January 1932) introduced a graphical means of observing or characterizing the stability of control loops. FIG. 2 illustrates such a "Nyquist Plot". Nyquist found that as the real (Re) and imaginary (Im) parts of the loop gain of a system were plotted as a function of frequency (f) from zero to infinity, if the resulting curve did not contain "−1" (as represented by curve I in FIG. 2), then the system would be stable. If the resulting curve did contain "−1" (as represented by curve II in FIG. 2), the system would be unstable. This is consistent with Equation [1]; if the term γAB=−1, the expression goes to ∞. Such a condition indicates instability. A resulting curve of the sort represented by curve III in FIG. 2 was said to be conditionally stable.

The "gain margin" of a system is defined as the distance along the real (Re) axis between "−1" and the loop gain curve intersection with the real (Re) axis. The "phase margin" of a system is defined as the angle between the real (Re) axis and the intersection of the loop gain curve with unit gain circle 50. That is, gain margin is measured at a locus at which phase margin is 0°, and phase margin is measured at a locus at which gain margin is 1. Thus, for example in FIG. 2, curve I will have a gain margin of Δ, and will have a phase margin of θ.

As a system response approaches −1 on the real axis Re, oscillations within the system increase; that is, system instability increases. Such oscillations, or perturbations, may be caused by such influences as thermal noise, load changes (occasioned by, for example, thermal effects, on/off switching, and changes in switching states), switching noise or other influences.

System designers seeking to design systems that operate robustly and reliably generally observe system design rules to provide for stable system operation. These design rules are intended to allow for such factors as manufacturing variances, degradation of components with time, thermal variance, and other factors. Generally accepted system design rules for power supply apparatuses require phase margin $\geq 45°$, and gain margin $\geq -7$ to $-10$ dB.

Figure 3:
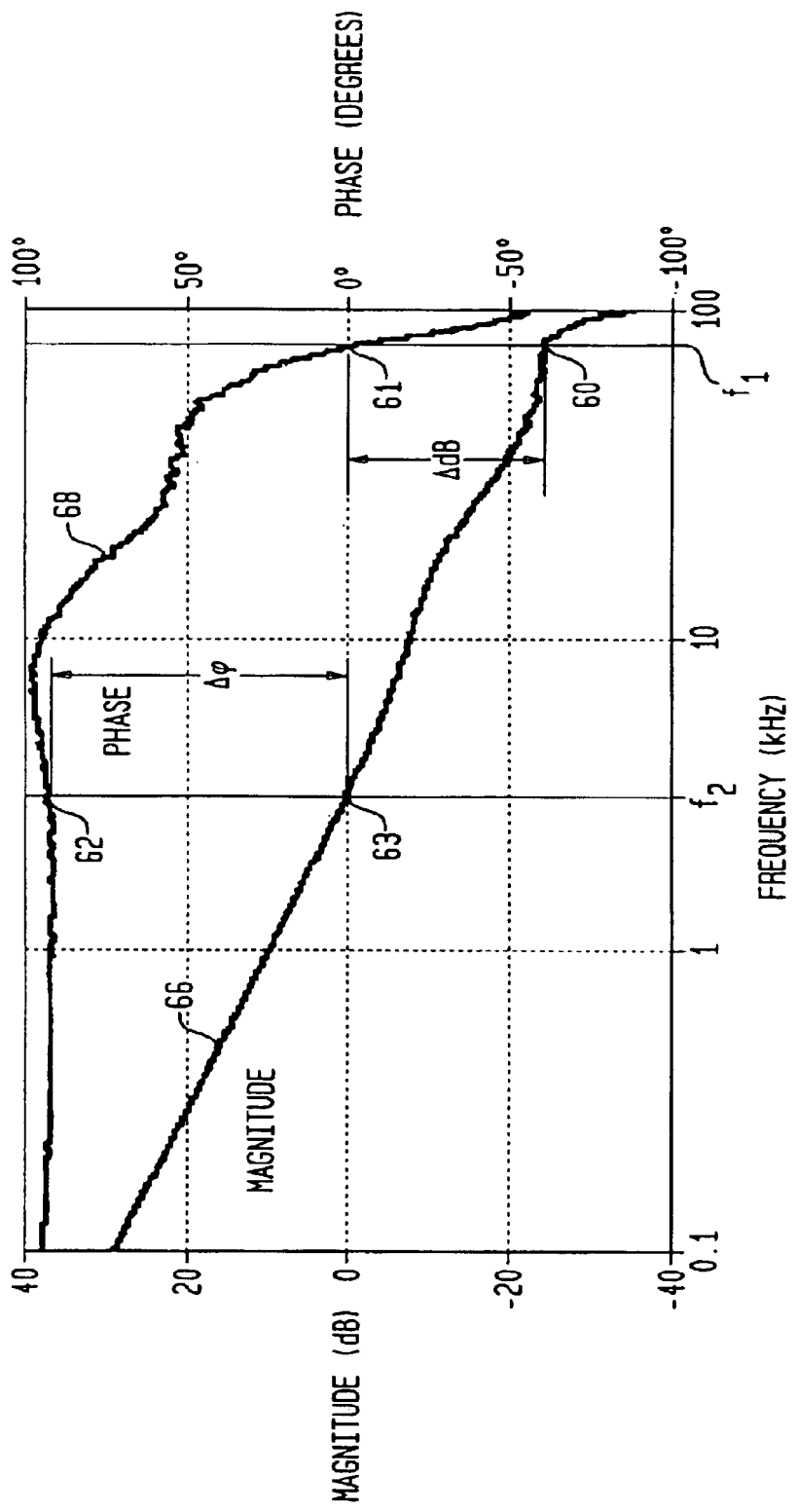
FIG. 3 is an exemplary Bode Plot of magnitude and phase of loop gain plotted as a function of frequency for a closed loop apparatus.

FIG. 3 is an exemplary Bode Plot of magnitude and phase of loop gain plotted as a function of frequency for a closed loop apparatus. In 1940, Bode (*Bell System Technical Journal*, July 1940), introduced another graphical method that is used to evaluate system stability. Bode's method is also covered in U.S. Pat. No. 2,123,178.

In FIG. 3 a "Bode plot" is illustrated in which magnitude 66 (in dB) and phase 68 (in degrees) of loop gain of an exemplary system are plotted as a function of frequency (in kHz). In the Bode Plot of FIG. 3, the gain margin $\Delta$dB is defined as the gain where phase is zero degrees (i.e., at point 61). Thus, gain margin $\Delta$dB is indicated at point 60 on the magnitude plot 66 of FIG. 3, at frequency $f_1$. The phase margin $\Delta\phi$ is defined as the phase where the gain is unity or 0 dB (i.e., at point 63). Thus, phase margin $\Delta\phi$ is indicated at point 62 on the phase plot 68 of FIG. 3, at frequency $f_2$.

In practice, the difficulty with Nyquist Plots (FIG. 2) and Bode Plots (FIG. 3) is that loop gain (LG) changes with changes in load ($Z_L$). Because loop gain (LG) changes, the plots (Nyquist Plots and Bode Plots) also change with changes in load ($Z_L$). So, as load ($Z_L$) is adjusted, a new Nyquist Plot or Bode Plot must be generated in order to evaluate the system with the new load ($Z_L$). This is a tedious and time consuming process.

Figure 4:
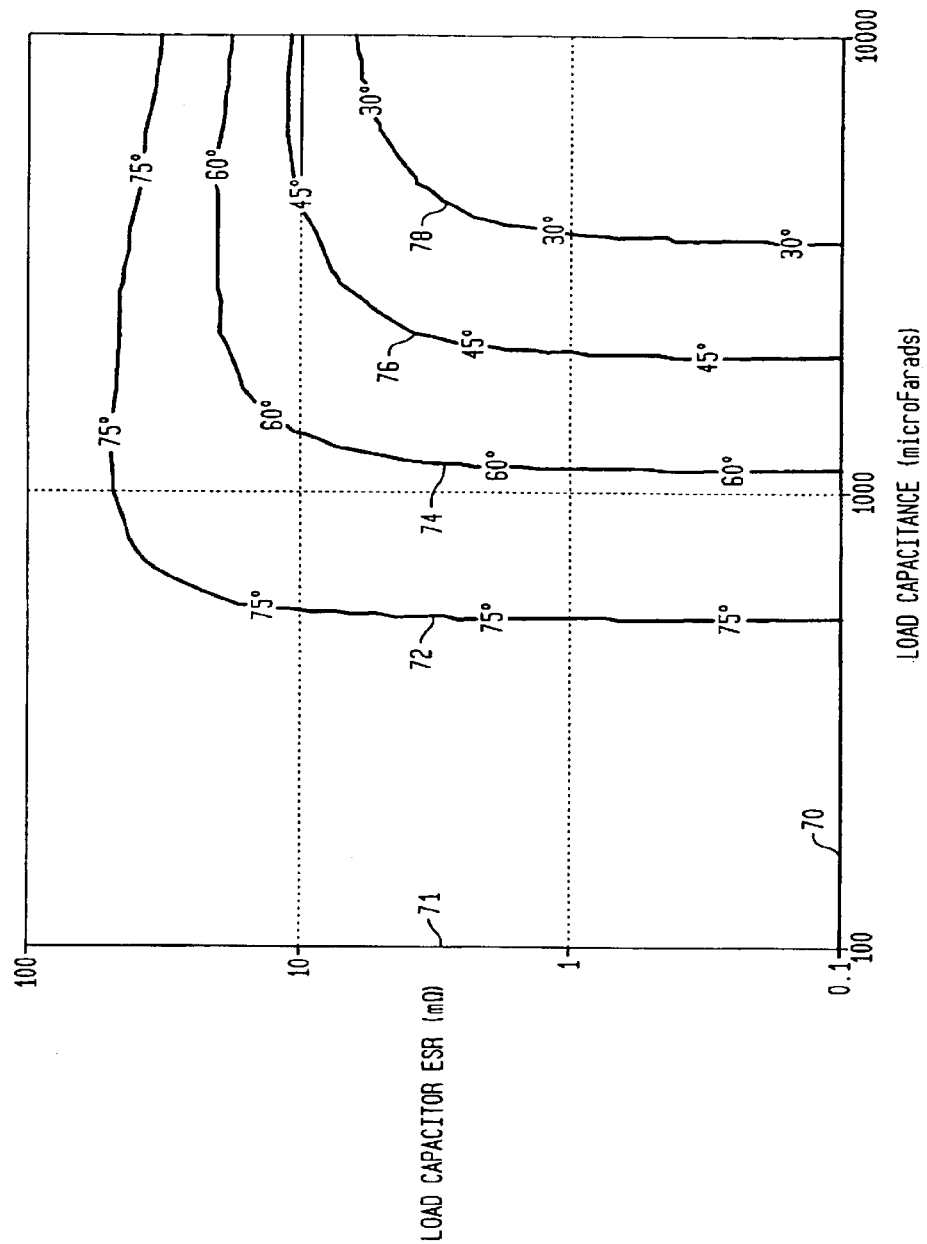
FIG. 4 is an exemplary plot of contours of constant phase margin plotted on axes representing complex load impedance of a closed loop apparatus in terms of capacitance and equivalent series resistance.

FIG. 4 is an exemplary plot of contours of constant phase margin plotted on axes representing complex load impedance of a closed loop apparatus in terms of capacitance and equivalent series resistance.

In 1995, Rozman and Fellhoelter, ("Circuit Considerations for Fast, Sensitive, Low-Voltage Loads in a Distributed Power System", APEC 1995 Conference Proceedings, pg. 34) recognized the difficulty in the tedious application of Nyquist Plots and Bode Plots in evaluating stability of closed loop apparatuses, such as power supply apparatuses, for different loads. Rozman and Fellhoelter introduced another graphical method for evaluating system stability.

Rozman and Fellhoelter assumed that the significant part of load impedance $Z_L$ can be described as a capacitor having a capacitance C and an equivalent series resistance ESR. In FIG. 4, a representative Rozman and Fellhoelter Plot is a contour plot wherein the two axes are a horizontal axis 70 relating to load capacitance C and a vertical axis 71 relating to equivalent series resistance ESR. Contour lines represent loci of constant phase margin $\Delta\phi$.

Thus, in FIG. 4, loci of a constant phase margin of 75° are represented by a curve 72. Loci of a constant phase margin of 60° are represented by a curve 74. Loci of a constant phase margin of 45° are represented by a curve 76. Loci of a constant phase margin of 30° are represented by a curve 78.

Rozman and Fellhoelter further contemplated a similar two-dimensional plot on axes relating to capacitance C and equivalent series resistance ESR establishing contour lines representing loci of constant gain margin. A plot of loci of constant gain margin according to the teachings of Rozman and Fellhoelter is considered within the understanding of one skilled in the art relevant to the subject matter of the present application. In the interest of avoiding prolixity, such a representative plot is not included in this application.

The Rozman and Fellhoelter Plots (loci of constant phase margin and loci of constant gain margin) are an efficient method for quickly determining the stability of a system in terms of gain margin or phase margin, given the capacitance C and equivalent series resistance ESR of a load. The disadvantage of this approach is that its requisite configuration of the load is too inflexible. That is, the Rozman and Fellhoelter Plot is restricted to loads that can be fairly characterized by a capacitor C and an associated equivalent series resistance ESR Real world loads are often too complex to be accurately approximated, or represented by a capacitor C and an associated equivalent series resistance ESR. For example, some loads may include different types or values of capacitors in parallel, some loads may exhibit different responses at different temperatures, and some loads may exhibit different responses at different frequencies. Such differences in load configuration involve complicating factors precluding accurate approximation of load response by a simple capacitance C and equivalent series resistance ESR.

The present inventor has concluded that stability analysis focuses on particular operating conditions. For example, the present inventor concluded that phase margin analysis does not need to be evaluated for a range of values of gain. Instead, phase margin analysis need only be concerned with loop gains equal to unity. Similarly, gain margin analysis need only be concerned with operations at 0° phase.

As is evident with a Bode Plot (FIG. 3), if one looks solely at the unity gain point (FIG. 3, point 63), the resulting phase is defined as the phase margin $\Delta\phi$ (FIG. 3, point 62). For gain margin analysis, one is only concerned with the point of zero phase margin (FIG. 3, point 61). In FIG. 3, the resulting negative gain is the gain margin $\Delta$dB, as indicated at point 60.

In view of such a recognition that the only relevant loci of concern in evaluating phase margin and gain margin of a system are, respectively, loci of unity gain and zero phase, Equation [3] may be employed to define an important new term:

$$LG = AB\frac{Z_L}{Z_L + Z_{OL}} = Ge^{j\theta} \quad [4]$$

where G is the magnitude of the gain and $e^{j\theta}$ accounts for phase margin ($\theta$). Equation [4] can be rewritten as:

$$Z_L = \frac{Z_{OL}}{\left[\frac{AB}{G}e^{-j\theta} - 1\right]} \quad [5]$$

It is important to note that Equation [5] has all load information on one side of the equal sign, and all other information on the other side of the equal sign.

Figure 5:
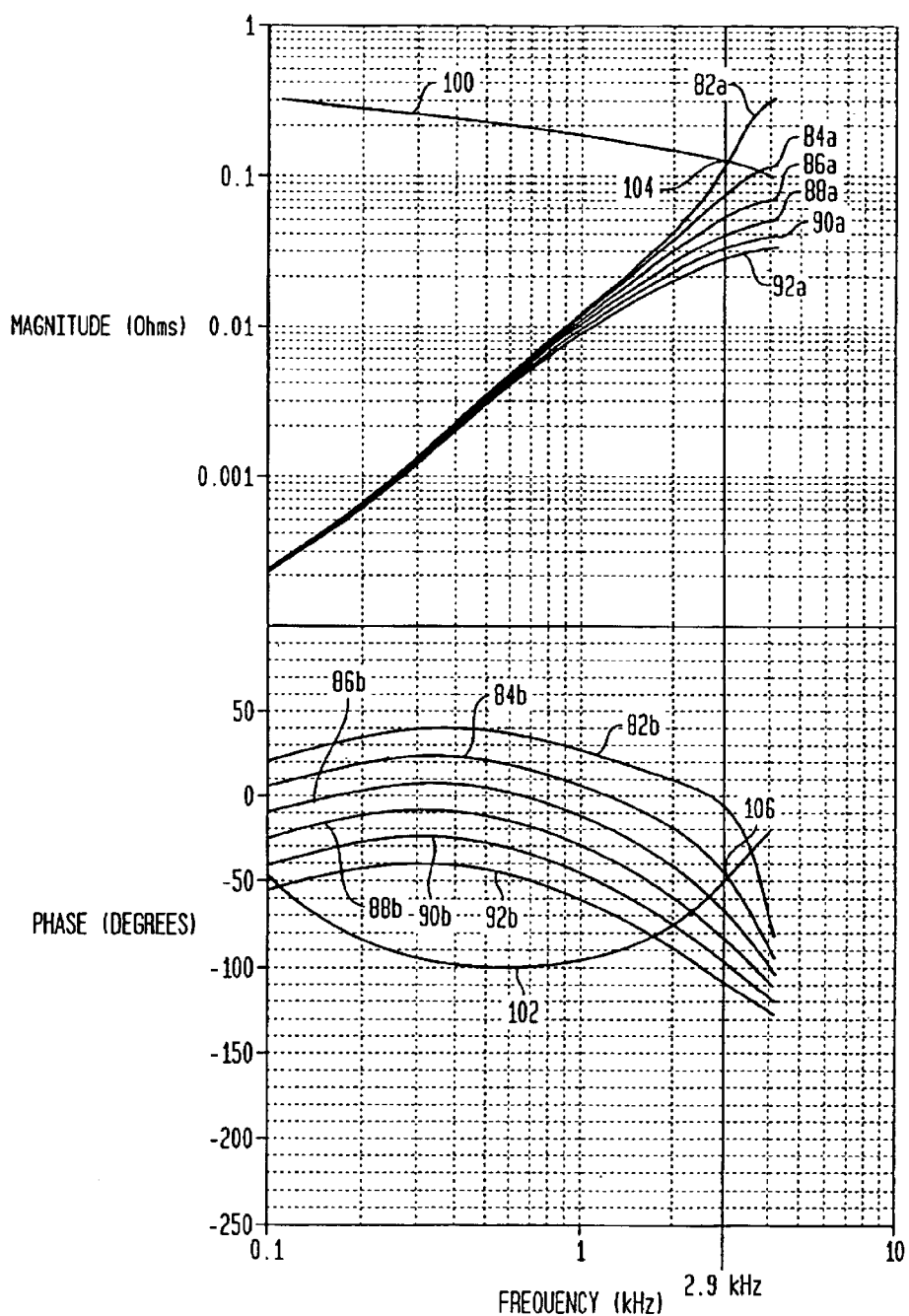
FIG. 5 is an exemplary plot generated according to the preferred embodiment of the method of the present invention.

The present invention, as it is employed for evaluating phase margin of a system, plots the right side of Equation [5] with gain magnitude G=1 (i.e., at a unity gain) in terms of magnitude and phase as a function of frequency. Multiple curves are generated on the same graph representing steps in values of phase margin. The steps in phase margin may be equal or not equal. The present inventor has determined that equal steps in phase margin plotting are preferred in order to facilitate interpolative employment of the plots for evaluation of a system vis-à-vis a particular load. FIG. 5 is one example of a reference tool based upon a vectoral determination of the right hand side of Equation [5] to determine magnitude and phase response of a system as a function of frequency, with gain magnitude G=1.

FIG. 5 is an exemplary plot generated according to the preferred embodiment of magnitude and phase characteristics of the right side of Equation [5] for a particular system, such as a power supply apparatus, is presented. The response curves developed and plotted in FIG. 5 are independent of load characteristics of the system. Thus, FIG. 5 is a phase margin evaluative tool.

A gain margin graphic evaluative tool may be similarly produced. In such a case, the present invention plots the right side of Equation [5] in terms of magnitude and phase as a function of frequency, with phase margin held at a value of 0°. Multiple curves, on the same graph are generated representing steps in values of gain margin. The steps in gain margin may be equal or not equal. The present inventor has determined that equal steps in gain margin plotting are preferred in order to facilitate interpolative employment of the plots for evaluation of a system vis-à-vis a particular load.

For ease of reference, the right hand side of Equation [5] will be referred to hereinafter as a Margin Function. When the magnitude and phase of the right hand side of Equation [5] is determined for a system, with gain magnitude G=1, the Margin Function will be referred to as a Phase Margin Function. When the magnitude and phase of the right hand side of Equation [5] is determined, with phase=0°, the Margin Function will be referred to as a Gain Margin Function.

In FIG. 5, Phase Margin Functions are plotted for an array of phase margin values. A Phase Margin Function indicating magnitude as a function of frequency for a phase margin of 90° is plotted as response curve 82a; a Phase Margin Function indicating phase for a phase margin of 90° is plotted as response curve 82b. A Phase Margin Function indicating magnitude as a function of frequency for a phase margin of 75° is plotted as response curve 84a; a Phase Margin Function indicating phase for a phase margin of 75° is plotted as response curve 84b. A Phase Margin Function indicating magnitude as a function of frequency for a phase margin of 60° is plotted as response curve 86a; a Phase Margin Function indicating phase for a phase margin of 60° is plotted as response curve 86b. A Phase Margin Function indicating magnitude as a function of frequency for a phase margin of 45° is plotted as response curve 88a; a Phase Margin Function indicating phase for a phase margin of 450 is plotted as response curve 88b. A Phase Margin Function indicating magnitude as a function of frequency for a phase margin of 30° is plotted as response curve 90a; a Phase Margin Function indicating phase for a phase margin of 30° is plotted as response curve 90b. A Phase Margin Function indicating magnitude as a function of frequency for a phase margin of 15° is plotted as response curve 92a; a Phase Margin Function indicating phase for a phase margin of 15° is plotted as response curve 92b.

Other reference tools maybe produced representing similar vectoral exercising of the right side of Equation [5] to facilitate utility of the information thereby gleaned. Examples of such alternate embodiments of reference tools include multidimensional vectoral tables and other arrays of data resulting from such a vectoral exercising of the right side of Equation [5]. Such reference tools, including multidimensional vectoral tables, may be maintained on-line within a computer device for facilitating mathematical or other algorithmic manipulation and evaluation of the data contained within the reference tool.

As an example of a use of the reference tool illustrated in FIG. 5, one may evaluate phase margin response of a system with a particular load by plotting the load magnitude response curve 100 and load phase response curve 102 for the particular test load on the phase margin evaluative tool illustrated in FIG. 5. Load magnitude response curve 100 intersects Phase Margin Function curve 82a (indicating Phase Margin Function magnitude when gain magnitude G=1; Equation [5]) at a locus 104. Locus 104 occurs at a sample frequency substantially equal to a value of 2.9 kHz. Applying that sample frequency value (2.9 kHz) to Phase Margin Function curves 82b, &4b, 86b, 88b, 90b, 92b (indicating Phase Margin Function phase when gain magnitude G=1; Equation [5]1) one may observe that the sample frequency (2.9 kHz) intersects load phase response curve 102 at a locus 106. Locus 106 is situated between Phase Margin Function curves 84b, 86b. Interpolating between Phase Margin Function curves 84b, 86b one may conclude that the system has a phase margin slightly less than 75°, approximately 73°, when employed with the particular load represented by load magnitude response curve 100 and load phase response curve 102.

The reference tool embodied in FIG. 5 enables quick evaluation of system response with a given load to determine whether the system will meet design criteria (e.g., phase margin $\geq 45°$; gain margin $\geq -7$ to $--10$ dB) when employed with the given load. No reconstruction of the evaluative tool (FIG. 5) is necessary to conduct an evaluation of the system with another load. Similar flexibility and ease of use is afforded by gain margin evaluative tools created using the method of the present invention.

There are at least two key advantages provided by the method and apparatus of the present invention over prior art conventional approaches previously described in connection with FIGS. 2–4. First, the evaluation tool does not need to be reconstructed or changed in order to evaluate iterations or changes in the load to be employed with the system. The evaluation tool may be employed to evaluate any load that can be characterized in terms of a frequency dependent magnitude and phase. Second, the evaluation tool gives a "fingerprint" that is characteristic of that particular power supply, amplifier or other closed loop apparatus for any load condition. This advantage is particularly useful, for example, in comparing power supply systems in order to determine which system may be better suited for handling a particular load In such a situation, plots of the two (or more) power supplies can be quickly and straightforwardly compared to determine which power supply would be more stable for a given load condition.

The inventor has discovered further utility relating to the method and tools described in connection with FIGS. 1–5. In addition to concerns with stability of a system, such as a power supply, or power converter, a designer is concerned with whether the system will exhibit acceptable transient characteristics when subjected to a perturbation. By way of example, a designer of a power converter apparatus is concerned with transient voltage and settling time of the system in response to imposition of a step-change of current (i.e., a perturbation of current applied to the system). Such concerns are important in order that a designer may produce a robust and reliable system that can continue operation within design constraints in the face of line surges or other variations that may be encountered in a real-life operational environment.

Figure 6:
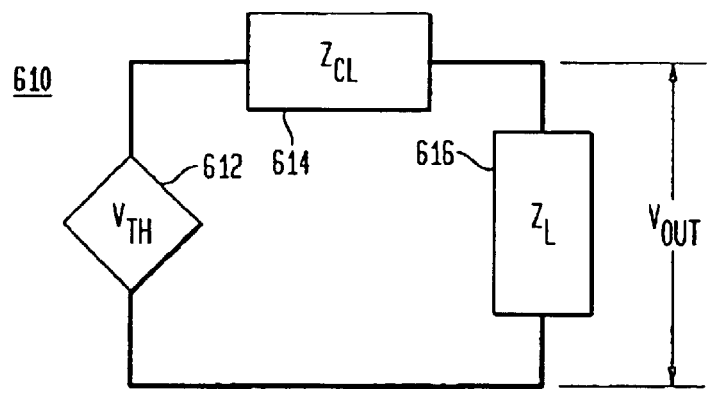
FIG. 6 is an electrical schematic diagram of a power converter apparatus that is a generalized equivalent to the circuit illustrated in FIG. 1.

FIG. 6 is an electrical schematic diagram of a power converter apparatus that is a generalized equivalent to the circuit illustrated in FIG. 1. In FIG. 6, the power converter model proposed by Thottuvelil and Verghese illustrated in FIG. 1 is restated as a power converter apparatus 610 that includes a Thevenin voltage source 612 connected in series with a characterized impedance 614 and a load impedance 616. Characterized impedance 614 has a value $Z_{CL}$, load impedance 616 has a value $Z_L$. An output voltage $V_{OUT}$ is measured across load impedance 616 as indicated in FIG. 6. When characterized impedance 614 is valued.

$$Z_{CL} = \frac{Z_{OL}}{1+AB} \qquad [6]$$

then power converter apparatus 610 operates substantially the same as power converter apparatus 10 (FIG. 1).

Figure 7:
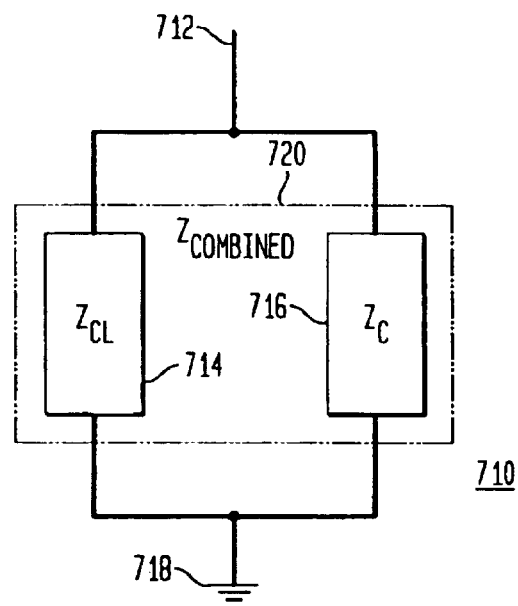
FIG. 7 is an electrical schematic diagram of a power converter of the sort illustrated in FIG. 6, configured for evaluating transient output voltage characteristics.

To evaluate the response of output voltage VOL-T for load impedance 616 having various values of $Z_L$, Thevenin voltage source 612 is shorted and the equivalent circuit for power converter apparatus 616 is configured as illustrated in FIG. 7.

FIG. 7 is an electrical schematic diagram of a power converter of the sort illustrated in FIG. 6, configured for evaluating transient output voltage characteristics. In FIG. 7, equivalent power converter apparatus 710 includes a characterized impedance 714 and a load impedance 716 coupled in parallel intermediate a voltage source (not shown in FIG. 7) connected at a source locus 712 and a ground 718. Characterized impedance 714 has a value of $Z_{CL}$; load impedance 716 has a value of $Z_L$. Thus, there is a combined impedance 720 intermediate source locus 712 and ground 718 that includes characterized impedance 714 and load impedance 716. Combined impedance 720 has a value $Z_{COMBINED}$ that is defined by:

$$Z_{COMBINED} = \frac{Z_{CL} \bullet Z_L}{Z_{CL} + Z_L} \qquad [7]$$

Plotting the various responses of the various impedance values $Z_{OL}$ (open-loop output impedance 15; FIG. 1), closed loop impedance, $Z_L$ (load impedance 716; FIG. 7) and $Z_{COMBINED}$ (combined impedance 720; FIG. 7) as a function of frequency yields an interesting revelation.

Figure 8:
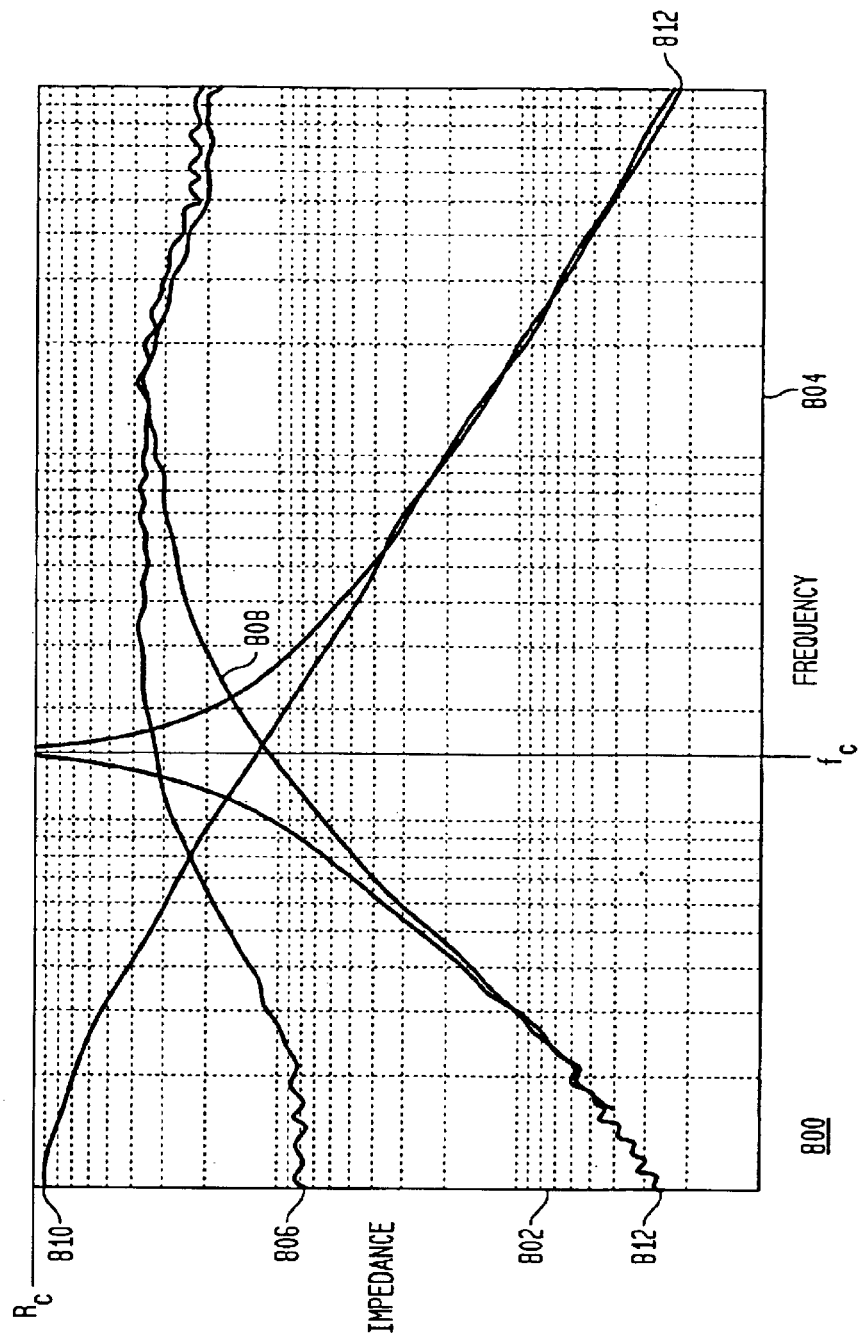
FIG. 8 is a graphic plot as a function of frequency of various impedances in the closed loop system of FIG. 7.

FIG. 8 is a graphic plot as a function of frequency of various impedances included in the closed loop system of FIG. 7. In FIG. 8, a graph 800 plots impedance values on an impedance axis 802 against frequency values on a frequency axis 804. A response curve 806 indicates response of open loop impedance values $Z_{OL}$ as a function of frequency. A response curve 808 indicates response of closed loop impedance values as a function of frequency. A response curve 810 indicates response of load impedance values $Z_L$ as a function of frequency. A response curve 812 indicates response of combined impedance values $Z_{COMBINED}$ as a function of frequency.

Response curve 812 is recognizable by those skilled in the electronic circuit design arts as being very similar to the response curve for a resonant circuit. Treating response curve as a quasi-resonant circuit and ascribing characteristics of a resonant circuit to response curve 812, one observes that response curve 812 exhibits a characteristic frequency $f_C$ and a characteristic impedance $R_C$. Characteristic impedance $R_C$ may be represented by an indication of pure resistance, R, because of peculiar properties of resonant circuits when they operate at their resonant frequency.

Figure 9:
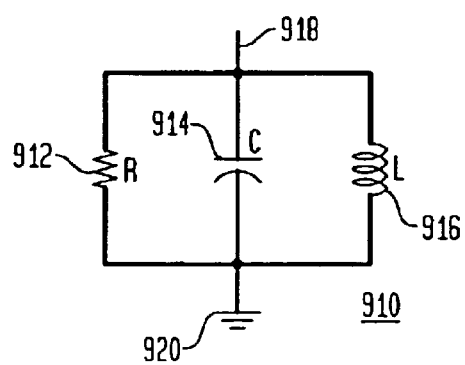
FIG. 9 is an electrical schematic diagram of a resonant circuit.

FIG. 9 is an electrical schematic diagram of a resonant circuit. In FIG. 9, a resonant circuit 910 includes a resistive load 912, a capacitive load 914 and an inductive load 916 coupled in parallel intermediate a voltage source (not shown in FIG. 9) connected at a source locus 918 and a ground 920. Resistive load 912 has a resistive value R, capacitive load 914 has a capacitive value C and inductive load 916 has an inductive value L. Resonant circuit 910 is sometimes referred to as a RLC circuit referring to the inclusion of a resistive load (R), an inductive load (L) and a capacitive load (C) in the circuit. At the resonant frequency for resonant circuit 910, the phase effects of capacitive load 914 and inductive load 916 effectively cancel so that the value of resonance for resonant circuit 910 is equal to the resistive load value R. That is, at resonance, $$[Z]=[R] \qquad [8]$$

Treating response curve 812 as representing a response of a resonant circuit allows evaluation of response curve 812 using certain attributes of resonant circuits. Resonant circuits are often described in terms of the circuit Q, sometimes referred to as the "quality" of the circuit. Circuit Q is a subject that has been the object of much study, and various relations among circuit parameters as they relate to Q have been established.

The response of such resonant circuits can be considered to be the superposition of two responses: a steady state response and a transient response. The transient response describes the behavior of the circuit immediate following a disturbance and the steady state response is the long term response after the transient response has subsided.

Application of Ohm's Law to describe the steady state relationship among circuit parameters when applying a step-altered current (i.e., a current that is substantially instantaneously altered in value) in a circuit yields:

$$V_{STEADY\ STATE} = R_{DC\ SUPPLY} \bullet I_{STEP} \qquad [9]$$

Figure 10:
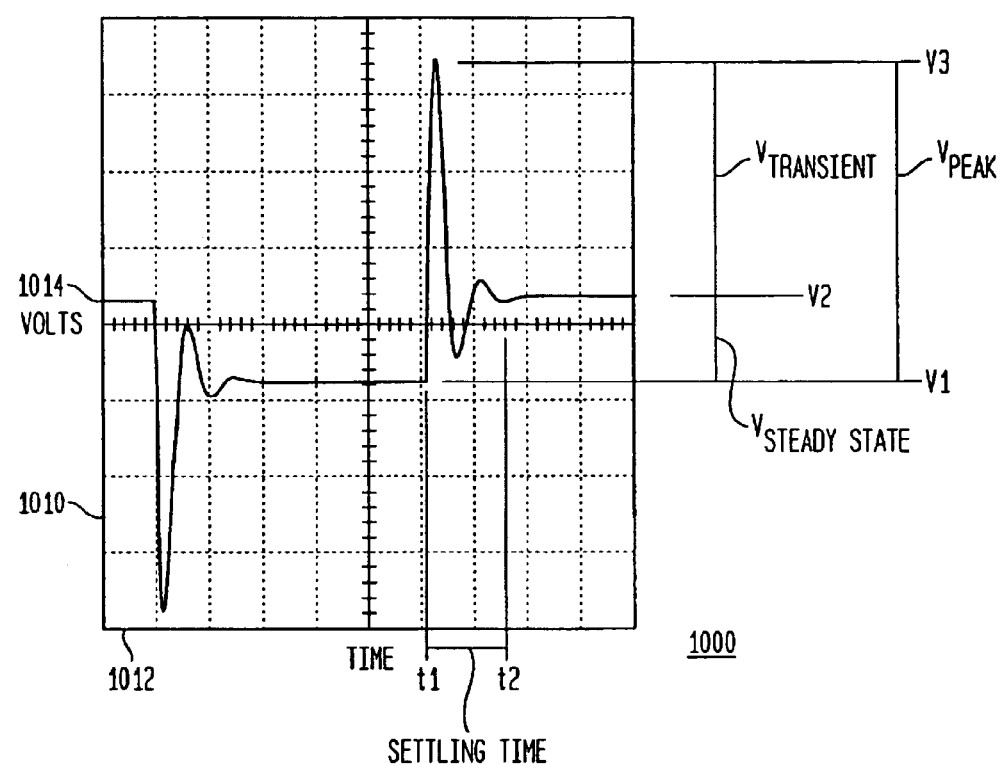
FIG. 10 is a graphic plot of signal amplitude as a function of time, illustrating various parameters associated with describing a signal response.

FIG. 10 is a graphic plot of signal amplitude as a function of time, illustrating various parameters associated with describing a signal response. In FIG. 10, a graphic plot 1000 indicates response of a voltage signal 1014 in terms of voltage amplitude plotted on a voltage axis 1010 as a function of time, indicated on a time axis 1012. A step-alteration of current (in this case, a step-increase) is imposed at a time t1, as manifested by an increase of voltage response signal 1014. In particular, voltage response signal 1014 increases from a voltage amplitude V1 to a voltage amplitude value V3. After reaching voltage amplitude value V3, voltage response signal 1014 drops to a lower value, and oscillates for a time before settling at a voltage amplitude value V2. A first current level supported a voltage response at voltage amplitude V1 until time t1. After imposition of the step-increase in current (at time t1) the apparatus for which voltage response signal 1014 is relevant experienced a voltage transient displacement having an amplitude (V3–V2), and having a peak value equal to (V3–V1). The transient response (i.e., the disturbance in voltage response signal 1014) thus recorded lasted for a time following time t1. By a time t2, voltage response signal 1014 had settled (i.e., damped) to a value within a predetermined percentage (for example, 1%–2%) of the steady state value of voltage response signal 1014 at the higher current level (that is, voltage level V2). The interval (t1–t2) is the settling time for the circuit experiencing the response indicated by voltage response curve 1014. These two parameters—peak transient voltage and settling time—are commonly regarded along with circuit stability by system designers in evaluating transient response of a system.

Solving equations that describe RLC circuits to ascertain times of occurrences of peak values of R, L and C (e.g., by determining the derivatives of the equations and setting the derivative equations equal to 0) permits determination of time of occurrence of peak voltage values. Knowing the time of peak occurrence permits determination of the peak value of the voltage. By expressing the equations in terms of Q according to well-known definition of Q in terms of R, L and C, the following valuable expression is derived from expression [9]:

$$V_{TRANSIENT} = I_{STEP} \bullet R_{COMBINED\ CIRCUIT} \bullet \frac{1}{Q} \bullet e^{\left[\frac{-\tan^{-1}\sqrt{4Q-1}}{\sqrt{4Q-1}}\right]} \quad [10]$$

One expression defining Q that is valuable to the present invention is a solution for Q in terms of phase margin ($\phi_m$) provided by Erickson (*Fundamentals of Power Electronics*; Erickson, Robert; Kluwer Academic Publishers, Boston Mass.; 1997; p. 336):

$$Q = \frac{\sqrt{\cos\varphi_m}}{\sin\varphi_m} \quad [11]$$

Substituting expression [11] for Q in expression [10] yields an expression for $V_{TRANSIENT}$ that is set forth in terms of phase margin ($\phi_m$), thereby avoiding employment of Q as a term in the expression. This expression is particularly applicable for use with the present invention, as will be described hereinafter at least in connection with FIGS. 13 and 14. Thus, expression [10] may be expressed as:

$$V_{TRANSIENT} = I_{STEP} \cdot R_{COMBINED\ CIRCUIT} \cdot \Gamma(\phi_m) \quad [12]$$

where $\Gamma(\phi_m)$ comprises the last term of expression [10] set forth in terms of phase margin ($\phi_m$)

The combined resistance of resonant circuit 910 is equal to the combined impedance of resonant circuit 910 at characteristic frequency $f_C$ (FIG. 8).

It is known, from expression [6] that:

$$Z_{CL} = \frac{Z_{OL}}{1+AB} \quad [6]$$

It, therefore, follows that:

$$Z_{OL} = Z_{CL}(1+AB) \quad [13]$$

It is known, from expression [3] that:

$$\text{Loop Gain} = AB\frac{Z_L}{Z_L + Z_{OL}} \quad [3]$$

Substituting $Z_{OL}$ from expression [13] into expression [3] yields:

$$\text{Loop Gain} = AB\frac{Z_L}{Z_L + Z_{CL}(1+AB)} \quad [14]$$

Rearranging expression [14] yields:

$$Z_{CL} = Z_L\frac{\left[\frac{AB}{\text{Loop Gain}} - 1\right]}{1+AB} \quad [15]$$

It is known, from expression [7] that:

$$Z_{combined} = \frac{Z_L Z_{CL}}{Z_L + Z_{CL}} \quad [7]$$

Substituting expression [15] into expression [7] yields:

$$Z_{combined} = \frac{Z_L^2\left[\frac{AB}{\text{Loop Gain}} - 1\right]}{Z_L\left[AB + \frac{AB}{\text{Loop Gain}}\right]} \quad [16]$$

Given that we are interested in the impedance at characteristic frequency $f_C$, that is, when $$\text{Loop Gain} = e^{j\phi_m} \quad [17]$$

(see expression [4], for a unity gain condition), substituting expression [17] into expression [16] and rearranging yields:

$$Z_{combined} = Z_{Lf(c)}\frac{\left[1 - \frac{e^{j\phi_m}}{AB}\right]}{1 + e^{j\phi_m}} \quad [18]$$

where $Z_{Lf(c)}$ is the load impedance $Z_L$ at the characteristic frequency, $f_C$.

Substituting expression [18] into expression [12] yields:

$$V_{TRANSIENT} = I_{STEP} \bullet Z_{Lf(c)}\frac{\left[1 - \frac{e^{j\phi_m}}{AB}\right]}{1 + e^{j\phi_m}} \bullet \Gamma(\varphi_m) \quad [19]$$

The last two terms of expression [19] are expressed solely in terms of phase margin ($\phi_m$) and characteristic frequency $f_C$. For that reason, expression [19] my be set forth as:

$$V_{TRANSIENT} = I_{STEP} \cdot Z_{Lf(c)} \cdot Y(\phi_m, f) \quad [20]$$

The last term of expression [20] is employed as a multiplier factor expressed solely in terms of phase margin ($\phi_m$) as a function of frequency, f.

Figure 11:
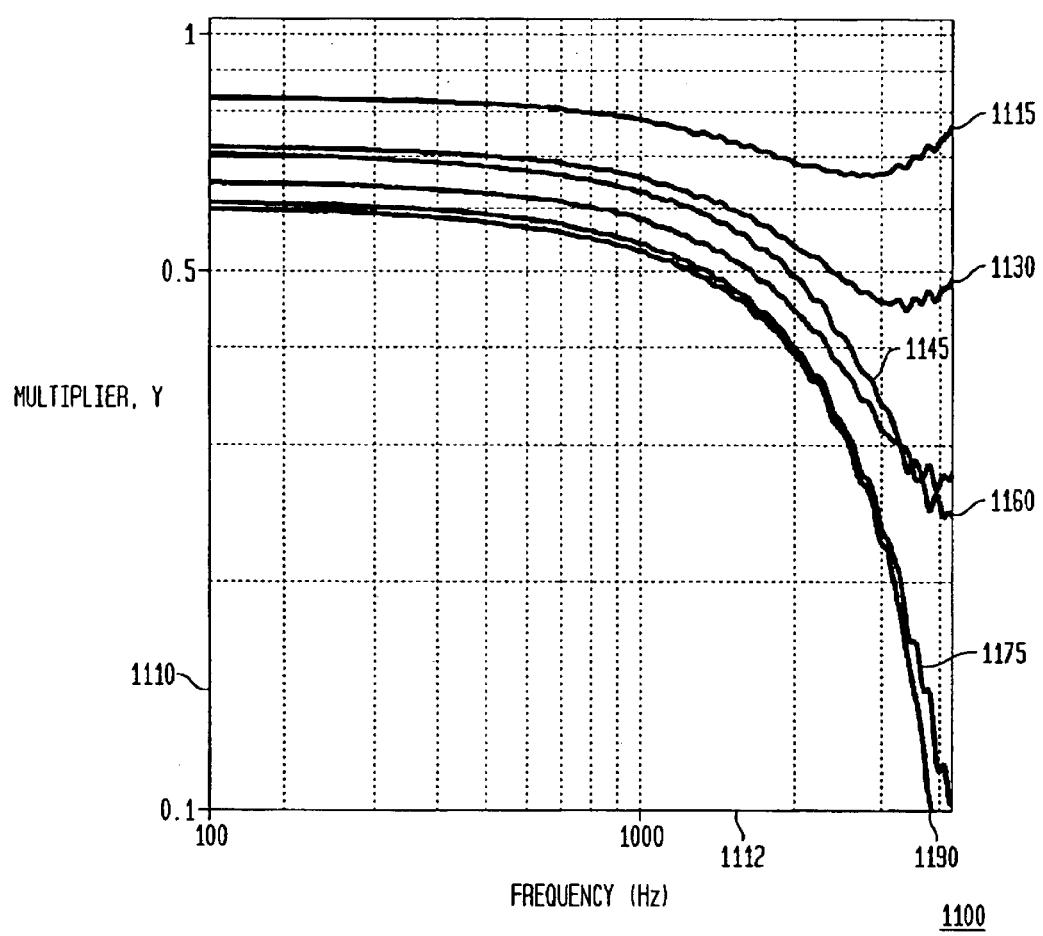
FIG. 11 is a graphic plot of multiplier: Y, as a function of frequency for various values of phase margin.

FIG. 11 is a graphic plot of multiplier Y as a function of frequency for various values of phase margin for a particular power supply. In FIG. 11, a graphic plot 1100 indicates response of multiplier Y plotted on a multiplier axis 1110 as a function of frequency plotted on a frequency axis 1112, for various phase margin values. Thus, curve 1115 indicates response of multiplier Y for a phase margin of 15 degrees. Curve 1130 indicates response of multiplier Y for a phase margin of 30 degrees. Curve 1145 indicates response of multiplier Y for a phase margin of 45 degrees. Curve 1160 indicates response of multiplier Y for a phase margin of 60 degrees. Curve 1175 indicates response of multiplier Y for a phase margin of 75 degrees. Curve 1190 indicates response of multiplier Y for a phase margin of 90 degrees.

One may define a settling factor according to the following relationship:

$$\text{Settling Time} = \frac{\text{Settling Factor}}{f(c)} \quad [21]$$

In such a relationship, the settling factor amounts to an estimate of the number of oscillations a signal response takes to damp to a predetermined level.

Figure 12:
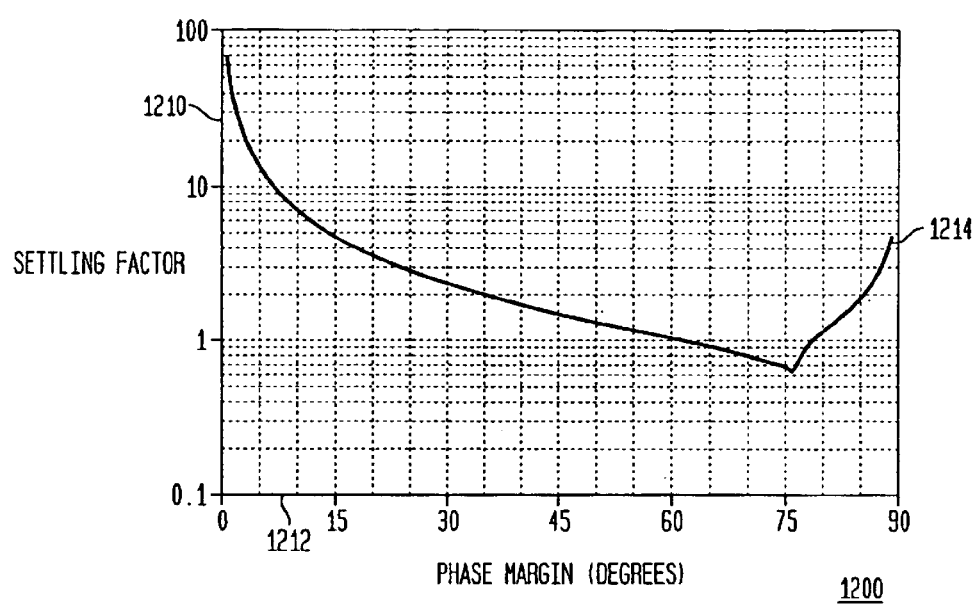
FIG. 12 is a graphic plot of settling factor at the characteristic frequency of a system as a function of phase margin.

FIG. 12 is a graphic plot of settling factor at the characteristic frequency of a system as a function of phase margin.

In FIG. 12, a graphic plot 1200 indicates a response curve 1214 for a settling factor plotted on a settling factor axis 1210 and a phase margin axis 1212.

Figure 13B:
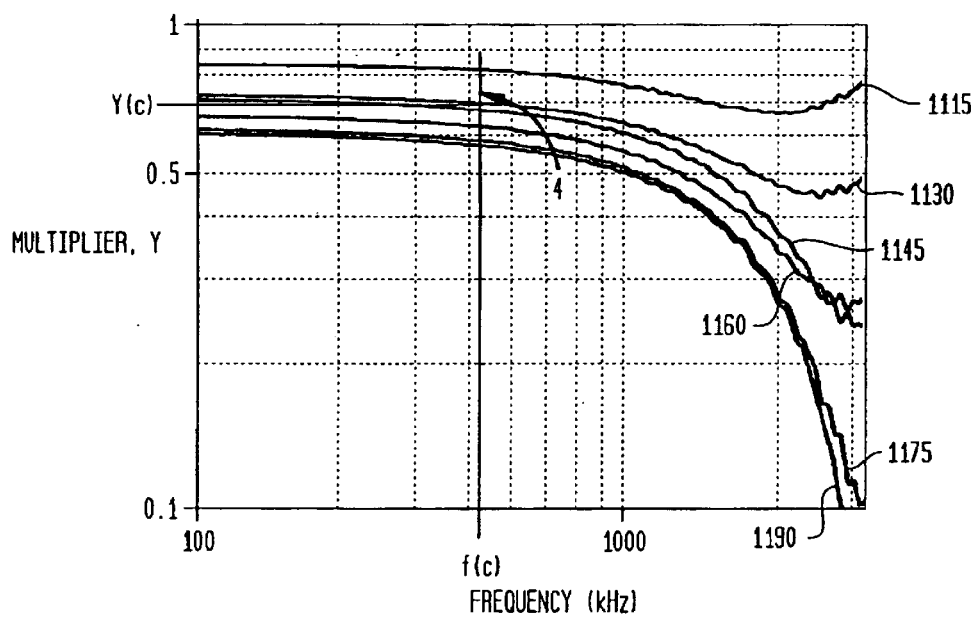
FIGS. 13(A) and (B) illustrate application of one aspect of the method of the present invention.

FIGS. 13(A) and (B) illustrate application of one aspect of the method of the present invention. FIG. 13(A) is a plot of phase responses for various phase margins as a function of frequency (lower portion of FIG. 13(A)), and impedance magnitude responses for various phase margins as a function of frequency (upper portion of FIG. 13(A)). FIG. 13(B) is a plot of multiplier Y for various phase margins as a function of frequency. Curve 1115 indicates response of multiplier Y as a function of frequency at a phase margin of 15 degrees. Curve 1130 indicates response of multiplier Y as a function of frequency at a phase margin of 30 degrees. Curve 1145 indicates response of multiplier Y as a function of frequency at a phase margin of 45 degrees. Curve 1160 indicates response of multiplier Y as a function of frequency at a phase margin of 60 degrees. Curve 1175 indicates response of multiplier Y as a function of frequency at a phase margin of 75 degrees. Curve 1190 indicates response of multiplier Y as a function of frequency at a phase margin of 90 degrees. Thus, FIG. 13(B) is a substantially faithful reproduction of FIG. 11.

FIG. 13(A) is a graphic tool of the sort described in detail in connection with FIG. 5. A load magnitude response curve 100 is plotted in the upper portion of FIG. 13(A) with phase margin response curves 82a, 84a, 86a, 88a, 90a, 92a. A load phase response curve 102 is plotted in the lower portion of FIG. 13(A) with phase margin response curves 82b, 84b, 86b, 88b, 90b, 92b. FIG. 13 will be employed to exemplify practice of the method of the present invention.

The method of the present invention preferably begins by noting the intersection of load magnitude response curve 100 with an appropriate phase margin response 82a, 84a, 86a, 88a, 90a, 92a in the upper plot of FIG. 13(A). In exemplary phase margin responses 82a, 84a, 86a, 88a, 90a, 92a indicated in FIG. 13, the various phase margin responses substantially converge at an intersection with load magnitude response curve 100. That intersection of load magnitude response curve 100 with phase margin responses 82a, 84a, 86a, 88a, 90a, 92a occurs substantially at a frequency value of 420 Hz, as indicated generally by index 1. Thus, the characteristic frequency Q: of the apparatus being evaluated (the apparatus being evaluated is not shown in FIG. 13) is 420 Hz. If the various phase margin responses 82a, 84a, 86a, 88a, 90a, 92a were more divergent in the area of intersection with load magnitude response curve 100, the choice of which phase margin response 82a, 84a, 86a, 88a, 90a, 92a to use for determining characteristic frequency $f_C$ requires determining the frequency value that intersects load magnitude response curve 100 and a given phase margin response curve (or an interpolated value for phase margin response) in the upper plot of FIG. 13(A) and also intersects load phase response curve 102 and the same phase margin response curve (or interpolated value for phase margin) in the lower plot of FIG. 13(A).

Having ascertained characteristic frequency $f_C$ using the upper plot of FIG. 13(A), the method next determines the point at which characteristic frequency $F_C$ intersects load phase response curve 102 in the lower plot of FIG. 13(A). In the exemplary plot of FIG. 13, characteristic frequency $f_C$ 420 Hz intersects load phase response curve 102 at a phase margin value of 38 degrees, as generally indicated by index 2. Continuing with the exemplary practice of the method of the present invention illustrated in FIG. 13, the next step involves using characteristic frequency $f_C$ and the phase margin. In order to do so, one returns to the upper plot of FIG. 13(A) to ascertain intersection of characteristic frequency $f_C$ ($f_C$=420 Hz) with the phase margin response locus ($\phi_m$=38 degrees) to ascertain load impedance at characteristic frequency $Z_{Lf(c)}$. The upper plot of FIG. 13 (A) yields a value for impedance at characteristic frequency $Z_{Lf(c)}$ of 0.037 ohms, as generally indicated by index 3.

The next step in the exemplary practice of the method of the present invention illustrated in FIG. 13 requires addressing FIG. 13(B) using characteristic frequency $F_C$ ($f_C$ 420 Hz) to ascertain intersection of characteristic frequency $f_C$ with the phase margin value ($\phi_m$=38 degrees) obtained as described, and generally indicated by index 3.

Referring to FIG. 13(B), one may observe that multiplier Y has a value indicated by a characteristic frequency $F_C$ of 420 Hz with a phase margin $\phi_m$ of 38 degrees. The value so indicated for multiplier Y is 0.65, as generally indicated by index 4.

Substituting values for characteristic frequency $f_C$, phase margin $\phi_m$, load impedance at characteristic frequency $Z_{Lf(c)}$ and multiplier Y into expression [20] yields:

$$V_{TRANSIENT} = I_{STEP} \cdot Z_{Lf(c)} \cdot Y(\phi_m). \quad [20]$$

$$V_{TRANSIENT} = I_{STEP} \cdot (0.037) \cdot (0.65) \quad [22]$$

$$V_{TRANSIENT} = I_{STEP} \cdot (0.24) \quad [23]$$

Thus, peak transient voltage $V_{TRANSIENT}$ may be straightforwardly determined in terms of step change of current.

Figure 14A:
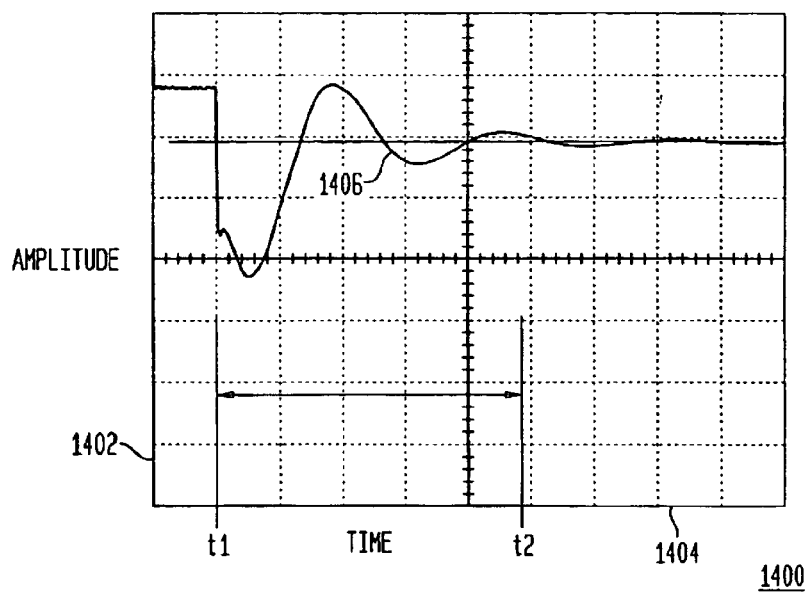
FIGS. 14(A) and (B) illustrate application of a second aspect of the method of the present invention.

FIGS. 14(A) and (B) illustrate application of a second aspect of the method of the present invention. In FIG. 14(A), a response curve 1406 is plotted on a voltage amplitude axis 1402 as a function of time indicated on a time axis 1404. Response curve 1406 illustrates a transient voltage response that undergoes a perturbation at a time t1. Response curve 1406 settles to within a defined acceptable percentage (not specified in FIG. 14(A)) of a steady state level at a time t2. The time interval (t1–t2) is the settling time for the apparatus for which response curve 1406 is representative.

Figure 14B:
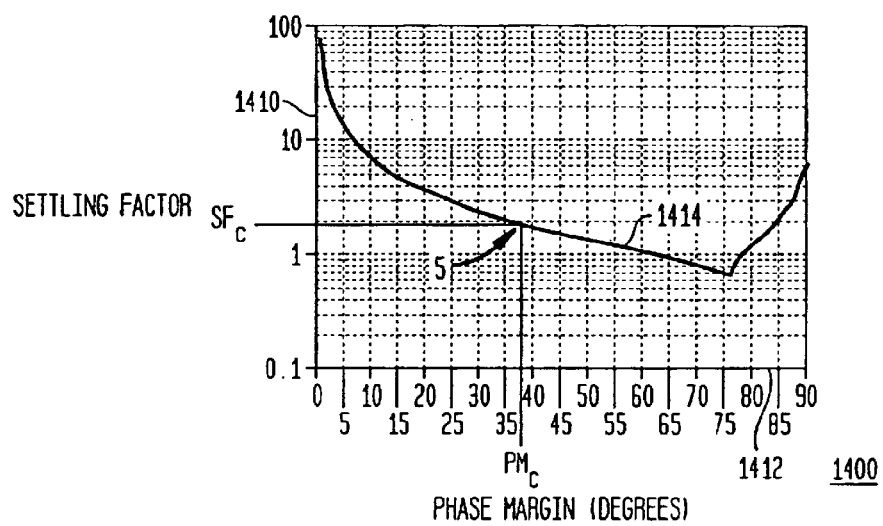

In FIG. 14(B), settling factor Y is plotted in a response curve 1414 against a settling factor axis 1410 as a function of phase margin ($\phi_m$) indicated on a phase margin axis 1412. Continuing the exemplary performance of the method of the present invention begun in connection with FIG. 13, the method next requires entering FIG. 14(B) at a value for phase margin at characteristic frequency $PM_C$ to determine the point at which phase margin at characteristic frequency $PM_C$ intersects response curve 1414. The intersection point indicates settling factor at characteristic frequency $SF_C$. In the exemplary illustration of FIG. 14(B), a phase margin at characteristic frequency $PM_C$ equal to 38 degrees (as previously determined in connection with FIG. 13) intersects response curve 1414 at a point corresponding to a value for settling factor at characteristic frequency $SF_C$ equal to 1.9, as generally indicated by index 5. Substituting values for settling factor at characteristic frequency $SF_C$ and characteristic frequency $F_C$ into expression [21] yields:

$$\text{Settling Time} = \frac{SettlingFactor}{f(c)} \quad [21]$$

$$\text{Settling Time} = \frac{1.9}{420 \text{ Hz}} = 4.5 \text{ milliseconds} \quad [24]$$

Response curves of the sort illustrated in FIGS. 5, 13 and 14 are embodiments of reference tools that can easily be created for a closed loop apparatus or product. The graphic reference tools in FIGS. 5, 13 and 14 are very useful in evaluating closed loop apparatuses for stability and transient response (e.g., peak transient voltage and settling time). It should be kept in mind that such graphic manifestations of the reference tools of the present invention are illustrative, and are not intended to limit embodying apparatuses of the present invention in a graphic form. Reference tools according to the present invention may advantageously be embodied in on-line forms that permit rapid, precise and repeated evaluations using computer programs substantially emulating the method of the present invention.

The method and apparatus of the present invention are important design tools that can be used to determine whether or not a particular power supply or other closed loop apparatus is appropriate for an application, or whether a given load will be stable and exhibit appropriate transient response characteristics with a particular power supply. In the past, such evaluative determinations have required extensive system evaluations to iteratively determine whether one particular apparatus or another apparatus would more suitably accommodate a particular load. Such evaluations were often conducted by the apparatus manufacturer based upon load characterizations provided by the customer. Significant delays in development were experienced by customers in awaiting evaluation results from the manufacturer.

The load-independent characteristics of the method and apparatus of the present invention are of particular value because the method and apparatus of the present invention facilitate evaluation of apparatuses vis-à-vis particular loads by the customer without any need to await evaluations and testing by the manufacturer.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A method for predicting at least one transient response characteristic of a closed loop apparatus; said closed loop apparatus having an open loop impedance, a design load impedance, an output voltage and at least one inherent internal gain; the method comprising the steps of:

(a) identifying an impedance scaling factor associated with said closed loop apparatus; said impedance scaling factor being expressed in terms including said open loop impedance, said at least one inherent internal gain, a gain variable and a phase variable;

(b) vectorally establishing a first scaling value for said impedance scaling factor as a function of frequency while maintaining a first variable of said gain variable and said phase variable at a first working value to record said first scaling value for a plurality of frequencies;

(c) vectorally establishing a second scaling value for said impedance scaling factor as a function of frequency while maintaining a second variable of said gain variable and said phase variable at a second working value to record said second scaling value for a plurality of frequencies;

(d) creating a first reference tool relating said first scaling value with said second variable of said gain variable and said phase variable as a function of frequency;

(e) creating a second reference tool relating said second scaling value with said first variable of said gain variable and said phase variable as a function of frequency;

(f) identifying a combined impedance for said apparatus; said combined impedance involving said closed loop impedance, said at least one internal gain and said design load impedance;

(g) determining a combined impedance response of said combined impedance as a function of frequency;

(h) determining a characteristic frequency for said combined impedance response; said characteristic frequency occurring substantially at a peak value of said combined impedance response;

(i) employing at least one of said first reference tool and said second reference tool to establish a first design value for one parameter of phase margin and said design load impedance for said closed loop apparatus at said characteristic frequency;

(j) employing at least one of said first reference tool and said second reference tool to establish a second design value for the other parameter of phase margin and said design load impedance than said one parameter for said closed loop apparatus at said characteristic frequency;

(k) vectorally establishing a transient multiplier factor for said closed loop apparatus; said transient multiplier factor being associated with said output voltage of said closed loop apparatus with said design load impedance as a function of frequency for selected values of phase margin;

(l) creating a third reference tool relating said transient multiplier factor with said selected values of phase margin as a function of frequency;

(m) employing said third reference tool to establish a third design value for said transient multiplier factor associated with said characteristic frequency and at least one of said first design value and said second design value; and (n) mathematically combining at least two of said first design value, said second design value and said third design value with a design step current according to a predetermined relation to establish transient voltage excursion of said output voltage in response to an applied step current substantially at said characteristic frequency.

2. A method for predicting at least one transient response characteristic of a closed loop apparatus as recited in claim 1 wherein the method comprises the further steps of:

(o) treating said combined impedance response as relating to a resonant circuit to establishing a quasi-Q factor for said closed loop apparatus;

(p) establishing a settling factor for said closed loop apparatus; said settling factor being associated with said quasi-Q factor;

(q) creating a fourth reference tool relating said settling factor with phase margin for said closed loop apparatus;

(r) employing said fourth reference tool to establish a design settling factor associated with at least one of said first design value and said second design value; and (s) mathematically combining said design settling factor with said characteristic frequency according to a predetermined relation to establish settling time of said closed loop apparatus in response to said applied step current.

3. A method for predicting at least one transient response characteristic of a closed loop apparatus as recited in claim 1 wherein at least one of said first reference tool, said second reference tool and said third reference tool is created in a multidimensional graphic form.

4. A method for predicting at least one transient response characteristic of a closed loop apparatus as recited in claim 1 wherein at least one of said first reference tool, said second reference tool and said third reference tool is created as a multidimensional vectoral table.

5. A method for predicting at least one transient response characteristic of a closed loop apparatus as recited in claim 4 wherein said multidimensional vectoral table is maintained on-line.

6. A method for predicting at least one transient response characteristic of a closed loop apparatus as recited in claim 2 wherein at least one of said first reference tool, said second reference tool, said third reference tool and said fourth reference tool is created in a multidimensional graphic form.

7. A method for predicting at least one transient response characteristic of a closed loop apparatus as recited in claim 2 wherein at least one of said first reference tool, said second reference tool, said third reference tool and said fourth reference tool is created as a multidimensional vectoral table.

8. A method for predicting at least one transient response characteristic of a closed loop apparatus as recited in claim 7 wherein said multidimensional vectoral table is maintained on-line.

9. A method for predicting at least one transient response characteristic of a closed loop apparatus; said closed loop apparatus having an open loop impedance, a design load impedance, an output voltage and at least one inherent internal gain; the method comprising the steps of:

(a) providing a first reference tool associated with said apparatus; said first reference tool relating impedance response of said apparatus, independent of said design load impedance, with a first variable of a gain variable and a phase variable;

(b) providing a second reference tool associated with said apparatus; said second reference tool relating impedance response of said apparatus, independent of said design load impedance, with a second variable of a gain variable and a phase variable other than said first variable;

(c) determining a combined impedance response for said apparatus as a function of frequency; said combined impedance response involving said open loop impedance, said design load impedance and said at least one inherent internal gain;

(d) employing at least one of said first reference tool and said second reference tool to establish a first design value for one parameter of said phase variable and said design load impedance for said closed loop apparatus at a characteristic frequency; said characteristic frequency occurring substantially at a peak value of said combined impedance response;

(e) employing at least one of said first reference tool and said second reference tool to establish a second design value for the other parameter of said phase variable and said design load impedance than said one parameter for said closed loop apparatus at said characteristic frequency;

(f) vectorally establishing a transient multiplier factor for said closed loop apparatus; said transient multiplier factor being associated with said output voltage of said closed loop apparatus with said design load impedance as a function of frequency for selected values of phase margin;

(g) creating a third reference tool relating said transient multiplier factor with said selected values of phase margin as a function of frequency;

(h) employing said third reference tool to establish a third design value for said transient multiplier factor associated with said characteristic frequency and at least one of said first design value and said second design value; and (i) mathematically combining at least two of said first design value, said second design value and said third design value with a design step current according to a predetermined relation to establish transient voltage excursion of said output voltage substantially at said characteristic frequency in response to applying said design step current.

10. A method for predicting at least one transient response characteristic of a closed loop apparatus as recited in claim 9 wherein the method comprises the further steps of:

(j) treating said combined impedance response as relating to a resonant circuit to establishing a quasi-Q factor for said closed loop apparatus;

(k) establishing a settling factor for said closed loop apparatus; said settling factor being associated with said quasi-Q factor, (l) creating a fourth reference tool relating said settling factor with phase margin for said closed loop apparatus;

(m) employing said fourth reference tool to establish a design settling factor associated with at least one of said first design value and said second design value; and (n) mathematically combining said design settling factor with said characteristic frequency according to a predetermined relation to establish settling time of said closed loop apparatus in response to said applied step current.

11. A method for predicting at least one transient response characteristic of a closed loop apparatus as recited in claim 9 wherein at least one of said first reference tool, said second reference tool and said third reference tool is created in a multidimensional graphic form.

12. A method for predicting at least one transient response characteristic of a closed loop apparatus as recited in claim 9 wherein at least one of said first reference tool, said second reference tool and said third reference tool is created as a multidimensional vectoral table.

13. A method for predicting at least one transient response characteristic of a closed loop apparatus as recited in claim 12 wherein said multidimensional vectoral table is maintained on-line.

14. A method for predicting at least one transient response characteristic of a closed loop apparatus as recited in claim 10 wherein at least one of said first reference tool, said second reference tool, said third reference tool and said fourth reference tool is created in a multidimensional graphic form.

15. A method for predicting at least one transient response characteristic of a closed loop apparatus as recited in claim 10 wherein at least one of said first reference tool, said second reference tool, said third reference tool and said fourth reference tool is created as a multidimensional vectoral table.

16. A method for predicting at least one transient response characteristic of a closed loop apparatus as recited in claim 15 wherein said multidimensional vectoral table is maintained on-line.

17. An apparatus for predicting at least one transient response characteristic of a closed loop device; said closed loop device having an open loop impedance, a design load impedance, an output voltage and at least one inherent internal gain; the apparatus comprising:

(a) a first reference tool relating a first scaling value of an impedance scaling value associated with said closed loop device with a first design variable of a gain variable and a phase variable as a function of frequency relating to said closed loop device, said impedance scaling factor being expressed in terms independent of said load; said first scaling value being vectorally established as a function of frequency while maintaining other design variables than said first design variable at at least one working value to record said first scaling value for a plurality of frequencies;

(b) a second reference tool coupled with said first reference tool; said second reference tool relating a second scaling value of said impedance scaling factor associated with said closed loop device with a second design variable of a gain variable and a phase variable as a function of frequency; said second scaling value being vectorally established as a function of frequency while maintaining said first design variable at a second working value to record said second scaling value for a plurality of frequencies;

(c) a third reference tool coupled with at least one of said first reference tool and said second reference tool; said third reference tool relating a transient multiplier factor with selected values of phase margin of said closed loop device as a function of frequency; said transient multiplier factor being associated with said output voltage of said closed loop device with said design load impedance as a function of frequency for said selected values of phase margin.

18. An apparatus for predicting at least one transient response characteristic of a closed loop device as recited in claim 17 wherein the apparatus further comprises:

(d) a fourth reference tool coupled with at least one of said first reference tool, said second reference tool and said third reference tool; said fourth reference tool relating a settling factor with phase margin for said closed loop device; said settling factor being associated with a quasi-Q factor established for a combined impedance response of said closed loop device; said combined loop response involving said closed loop impedance, said at least one internal gain and said design load impedance; said combined impedance response being treated as a resonant circuit response when determined as a function of frequency for establishing said quasi-Q factor.

19. An apparatus for predicting at least one transient response characteristic of a closed loop device as recited in claim 17 wherein at least one of said first reference tool, said second reference tool and said third reference tool is created in a multidimensional graphic form.

20. An apparatus for predicting at least one transient response characteristic of a closed loop device as recited in claim 17 wherein at least one of said first reference tool, said second reference tool and said third reference tool is created as a multidimensional vectoral table.

21. An apparatus for predicting at least one transient response characteristic of a closed loop device as recited in claim 20 wherein said multidimensional vectoral table is maintained on-line.

22. An apparatus for predicting at least one transient response characteristic of a closed loop device as recited in claim 18 wherein at least one of said first reference tool, said second reference tool, said third reference tool and said fourth reference tool is created in a multidimensional graphic form.

23. An apparatus for predicting at least one transient response characteristic of a closed loop device as recited in claim 18 wherein at least one of said first reference tool, said second reference tool, said third reference tool and said fourth reference tool is created as a multidimensional vectoral table.

24. An apparatus for predicting at least one transient response characteristic of a closed loop device as recited in claim 23 wherein said multidimensional vectoral table is maintained on-line.

* * * * *